(12) United States Patent
Wu et al.

(10) Patent No.: US 9,059,769 B2
(45) Date of Patent: Jun. 16, 2015

(54) EQUALIZATION CIRCUIT AND EQUALIZATION SYSTEM

(75) Inventors: Zhaolei Wu, Chengdu (CN); Lei Li, Chengdu (CN)

(73) Assignee: IPGoal Microelectronics (Sichuan) Co., Ltd., Chengdu, Sichuan Province (CN)

( * ) Notice: Subject to any disclaimer, the term of this patent is extended or adjusted under 35 U.S.C. 154(b) by 469 days.

(21) Appl. No.: 13/494,028

(22) Filed: Jun. 12, 2012

(65) Prior Publication Data
US 2013/0076329 A1    Mar. 28, 2013

(30) Foreign Application Priority Data

Sep. 22, 2011    (CN) .......................... 2011 1 0282881

(51) Int. Cl.
*H04B 3/04* (2006.01)
*H04B 1/12* (2006.01)

(52) U.S. Cl.
CPC ... *H04B 1/12* (2013.01); *H04B 3/04* (2013.01)

(58) Field of Classification Search
CPC ............... H04B 1/12; H04B 3/04; H04B 3/14

USPC .......................................... 333/28 R; 375/229
See application file for complete search history.

(56) References Cited

U.S. PATENT DOCUMENTS

| 8,222,967 B1 * | 7/2012 | Raman et al. ................ 333/28 R |
| 2006/0001504 A1 * | 1/2006 | Singh et al. ................. 333/28 R |

* cited by examiner

*Primary Examiner* — Stephen E Jones

(57) ABSTRACT

An equalization circuit, includes a first input terminal, a second input terminal, a first output terminal, a second output terminal, a first regulating circuit, a second regulating circuit, and a bias voltage generating circuit. The bias voltage generating circuit is connected with both the first regulating circuit and the second regulating circuit. The first regulating circuit includes a first field effect transistor (FET), a second FET, a third FET, a fourth FET, a first resistor connected with the first FET, a second resistor connected with the second FET, a third resistor connected with the third FET, a fourth resistor connected with the fourth FET, a fifth resistor connected with the third FET, a sixth resistor connected with the fourth FET, a first capacitor connected with the third FET, and a second capacitor connected with the fourth FET. An equalization system is further provided.

9 Claims, 3 Drawing Sheets

EQUALIZATION CIRCUIT AND EQUALIZATION SYSTEM

BACKGROUND OF THE PRESENT INVENTION

1. Field of Invention

The present invention relates to an equalization circuit and an equalization system, and more particularly to an equalization circuit for a receiving terminal of a high-speed signal transmission system and an equalization system thereof.

2. Description of Related Arts

In a high-speed serial signal transmission system, due to factors such as backplane transmission and low-pass property of a transmission line, after a signal transmitted by a transmitting terminal passes through a variety of signal paths, high frequency energy thereof is inhibited, which leads to varying degrees of signal quality loss, and accordingly results in an error of the signal received by the receiving terminal.

In order to compensate the signal loss caused by the signal paths during transmitting, an equalizer is required to be added to the receiving terminal. However, due to high power consumption, a narrow regulating range, and etc., regulating of the received signal is frequently limited.

SUMMARY OF THE PRESENT INVENTION

In view of the descriptions mentioned above, it is necessary to provide an equalization circuit having a simple structure, a wide regulating range, and a controllable gain and an equalization system thereof.

An equalization circuit, comprises a first input terminal, a second input terminal, a first output terminal, a second output terminal, a first regulating circuit connected with the first input terminal and the second input terminal for regulating a frequency-amplitude characteristic of input signals at the first input terminal and the second input terminal, a second regulating circuit connected with the first regulating circuit, the first output terminal and the second output terminal, and a bias voltage generating circuit, wherein the bias voltage generating circuit is respectively connected with the first regulating circuit and the second regulating circuit, the first regulating circuit comprises a first field effect transistor (FET) connected with the second input terminal, a second FET connected with the first FET, a third FET, a fourth FET connected with the third FET, a first resistor connected with the first FET, a second resistor connected with the second FET, a third resistor connected with the third FET, a fourth resistor connected with the fourth FET, a fifth resistor connected with the third FET and the third resistor, a sixth resistor connected with the fourth FET and the fourth resistor, a first capacitor connected with the third FET and the fifth resistor, and a second capacitor connected with the fourth FET and the sixth resistor.

An equalization system, comprises a first input terminal, a second input terminal, a first output terminal, a second output terminal, a first regulating circuit connected with the first input terminal and the second input terminal for regulating a frequency-amplitude characteristic of differential signals at the first input terminal and the second input terminal, a second regulating circuit connected with the first regulating circuit for obtaining an appropriate regulating range of a transmission signal, and a bias voltage generating circuit for providing a constant current for the equalization system to work normally, wherein the bias voltage generating circuit is respectively connected with the first regulating circuit and the second regulating circuit.

Compared with the prior art, the equalization circuit and the equalization system according to preferred embodiments of the present invention regulate a zero pole, a dominant pole and a secondary pole to control a regulating range of high frequency transmission energy, so as to ensure an accuracy of a signal received by the receiving terminal in a high-speed serial signal transmission system. The equalization circuit and the equalization system according to preferred embodiments of the present invention have a simple structure, a wide regulating range, and a controllable gain.

These and other objectives, features, and advantages of the present invention will become apparent from the following detailed description, the accompanying drawings, and the appended claims.

DETAILED DESCRIPTION OF THE PREFERRED EMBODIMENT

Figure 1:
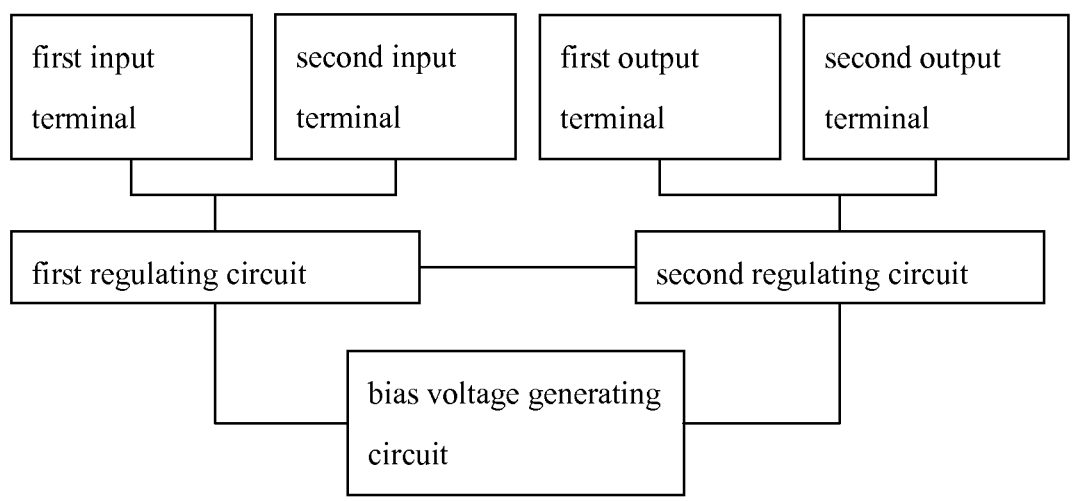
FIG. 1 is a system block diagram of an equalization system according to a preferred embodiment of the present invention.
Figure 2:
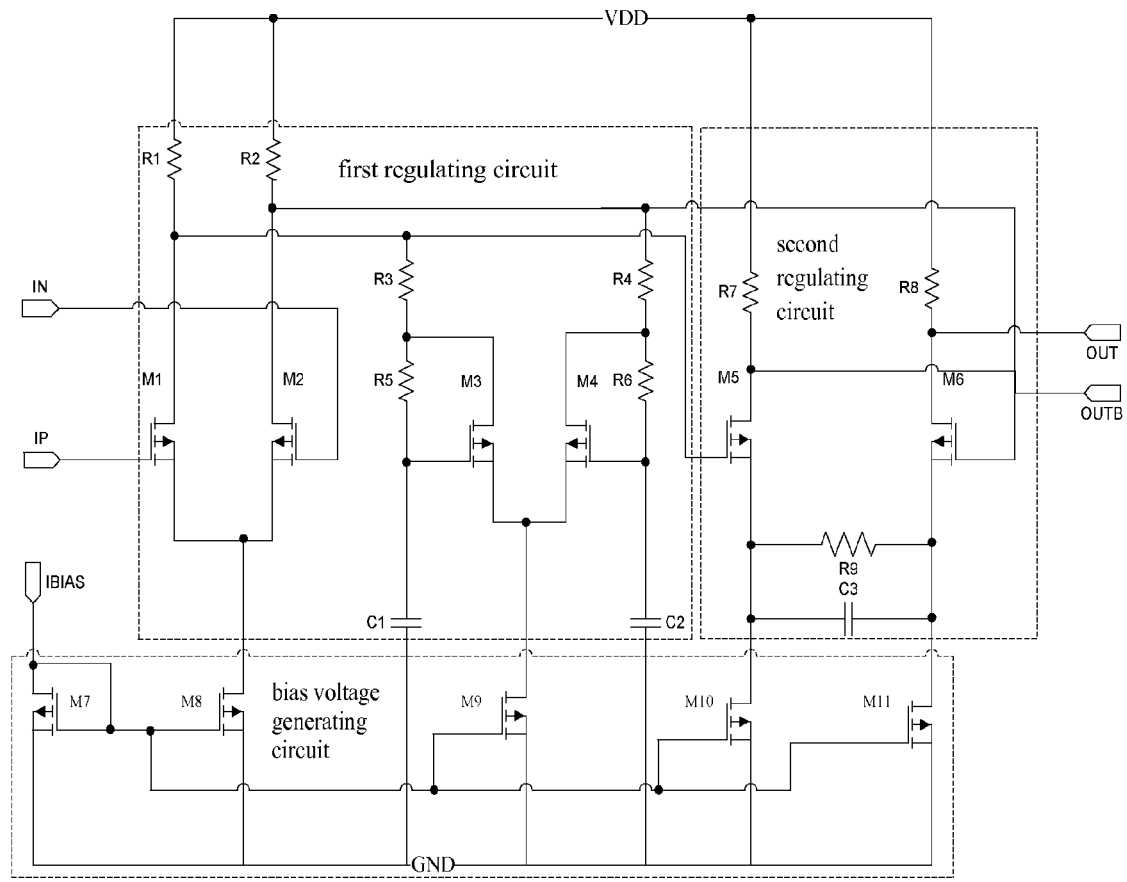
FIG. 2 is a specific circuit diagram of an equalization circuit according to a preferred embodiment of the present invention.
Figure 3:
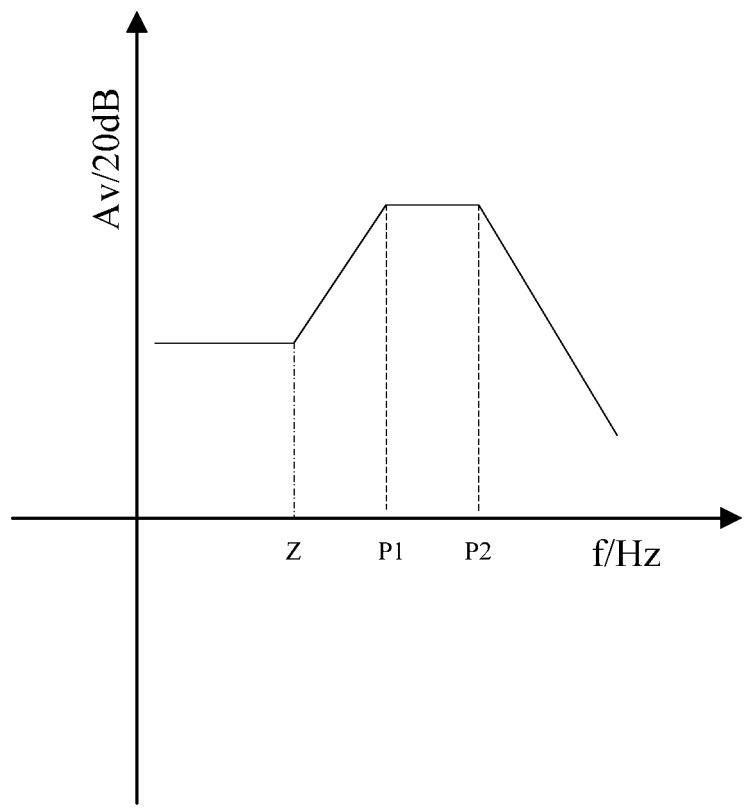
FIG. 3 is a transient bode diagram of a signal transmission of the equalization circuit according to the preferred embodiment of the present invention.

Referring to FIG. 1 and FIG. 2 of the drawings, an equalization system according to a preferred embodiment of the present invention is illustrated, comprising a first input terminal IN, a second input terminal IP, a first regulating circuit connected with the first input terminal IN and the second input terminal IP, a second regulating circuit connected with the first regulating circuit, a first output terminal OUT connected with the second regulating circuit, a second output terminal OUTB connected with the second regulating circuit, and a bias voltage generating circuit respectively connected with the first regulating circuit and the second regulating circuit. The first input terminal IN and the second input terminal IP are for receiving a pair of differential signals transmitted by a transmitting terminal in a high-speed serial signal transmission system, and transmitting the pair of differential signals received to the first regulating circuit; the first regulating circuit is for regulating a frequency-amplitude characteristic of signals at the first input terminal IN and the second input terminal IP, inhibiting a low-frequency signal, and increasing a high-frequency signal, so as to obtain a wide regulating range; the second regulating circuit is for further regulating the frequency-amplitude characteristic of the signals at the first input terminal IN and the second input terminal IP on a basis of the first regulating circuit, so as to obtain an appropriate regulating range required; the bias voltage generating circuit is for providing a constant current for the equalization system to work normally; the first output terminal OUT and the second output terminal OUTB are for outputting a pair of regulated differential signals. Also referring to FIG. 3 of the drawings, the equalization circuit according to a preferred embodiment of the present invention is capable of calculating a zero pole Z, a dominant pole P1 and a secondary pole P2, which are for regulating an input signal, via the first regulating circuit and the second regulating circuit, so as to control a range of high frequency transmission energy by regulating the zero pole Z, the dominant pole P1 and the secondary pole P2, and thus ensure an accuracy of a signal received by the receiving terminal in the high-speed serial signal transmission system.

Referring to FIG. 2 of the drawings, which is a specific circuit diagram of an equalization circuit according to a preferred embodiment of the present invention, the first regulating circuit comprises a first field effect transistor (FET) M1, a second FET M2, a third FET M3, a fourth FET M4, a first resistor R1, a second resistor R2, a third resistor R3, a fourth resistor R4, a fifth resistor R5, a sixth resistor R6, a first capacitor C1, and a second capacitor C2; the second regulating circuit comprises a fifth FET M5, a sixth FET M6, a seventh resistor M7, an eighth resistor M8, a ninth resistor M9, and a third capacitor C3; and the bias voltage generating circuit comprises a seventh FET M7, an eighth FET M8, a ninth FET M9, a tenth FET M10, and an eleventh FET M11.

According to the preferred embodiment of the present invention, specific circuit connections of the equalization circuit are as follows. A gate electrode of the first FET M1 is connected with the second output terminal IP, a gate electrode of the second FET M2 is connected with the first input terminal IN, so as to together receive the differential signals transmitted by the first input terminal IN and the second input terminal IP, a drain electrode of the first FET M1 is connected with a first terminal of the first resistor R1, a first terminal of the third resistor R3, and a gate electrode of a fifth FET M5, a drain electrode of the second FET M2 is connected with a first terminal of the second resistor R2, a first terminal of the fourth resistor R4, and a gate electrode of the sixth FET M6, both a source electrode of the first FET M1 and a source electrode of the second FET M2 are connected with a drain electrode of the eighth FET M8. A gate electrode of the third FET M3 is connected with a first terminal of the fifth resistor R5 and a first terminal of the first capacitor C1, a drain electrode of the third FET M3 is connected with a second terminal of the fifth resistor R5 and a second terminal of the third resistor R3, a gate electrode of the fourth FET M4 is connected with a first terminal of the sixth resistor R6 and a first terminal of the second capacitor C2, a drain electrode of the fourth FET M4 is connected with a second terminal of the sixth resistor R6 and a second terminal of the fourth resistor R4, both a source electrode of the third FET M3 and a source electrode of the fourth FET M4 are connected with a drain electrode of the ninth FET M9. A drain electrode of the fifth FET M5 is connected with a first terminal of the seventh resistor R7 and the second output terminal OUTB, a source electrode of the fifth FET M5 is connected with a first terminal of the ninth resistor R9, a first terminal of the third capacitor C3, and a drain electrode of a tenth FET M10. A drain electrode of the sixth FET M6 is connected with a first terminal of the eighth resistor R8 and the first output terminal OUT, a source electrode of the sixth FET M6 is connected with a second terminal of the ninth resistor R9, a second terminal of the third capacitor C3, and a drain electrode of the eleventh FET M11. A gate electrode of the seventh FET M7, a drain electrode of the seventh FET M7, a gate electrode of the eighth FET M8, a gate electrode of the ninth FET M9, a gate electrode of the tenth FET M10, and a gate electrode of the eleventh FET M11 are all connected with a bias voltage terminal IBIAS. A second terminal of the first resistor R1, a second terminal of the second resistor R2, a second terminal of the seventh resistor R7, and a second terminal of the eighth resistor R8 are all connected with a power source terminal VDD, a source electrode of the seventh FET M7, a source electrode of the eighth FET M8, a source electrode of the ninth FET M9, a source electrode of the tenth FET M10, and a source electrode of the eleventh FET M11 are all connected with a ground terminal GND.

Working principles of the equalization circuit according to a preferred embodiment of the present invention are as follows.

In order to simplify a calculation, according to the equalization circuit, a transmission function $H_{s1}(s)$ of the first regulating circuit and a transmission function $H_{s2}(s)$ of the second regulating circuit is calculated. Then according to the transmission function $H_{s1}(s)$ of the first regulating circuit and the transmission function $H_{s2}(s)$ of the second regulating circuit, a transmission function $H(s)$ of a total equalization circuit is obtained. According to the transmission function $H(s)$ of the total equalization circuit, a zero pole Z, a dominant pole P1, and a secondary pole P2 are obtained; so as to control a regulating range of high frequency transmission energy.

The transmission function of the first regulating circuit is $H_{s1}(s)$:

$$H_{s1}(s) = G_{m1} \times \left\{ \frac{R1[R3 + (1 + SR5C1)/(G_{mL} + SC1)]}{R1 + [R3 + (1 + SR5C1)/(G_{mL} + SC1)]} \right\}, \quad (1)$$

wherein $G_{m1}$ is a transconductance of the first FET M1, $G_{mL}$ is a transconductance of the third FET M3, and S=jw, wherein j is an imaginary number, w is an angular frequency.

The transmission function $H_{s2}(s)$ of the second regulating circuit for fine regulating is:

$$H_{s2}(s) = \frac{G_{m5}(1 + SR9C3)}{1 + G_{m5}R9 + SR9C3} \times R7, \quad (2)$$

wherein $G_{m5}$ is a transconductance of the fifth FET M5.

As the transmission function $H(s)$ of the total equalization circuit is about:

$$H(s) = H_{s1}(s) \times H_{s2}(s) \quad (3)$$

$$H(s) = \left\{ G_{m1} \times \left\{ \frac{R1[R3 + (1 + SR5C1)/(G_{mL} + SC1)]}{R1 + [R3 + (1 + SR5C1)/(G_{mL} + SC1)]} \right\} \right\} \times \left\{ \frac{G_{m5}(1 + SR9C3)}{1 + G_{m5}R9 + SR9C3} \times R7 \right\},$$

the zero pole Z, the dominant pole P1, the secondary pole P2, and a low-frequency gain AV of the equalization circuit are obtained by reorganizing the equation (3) as following:

$$Z \approx \frac{1}{R5C1}$$

$$P_1 \approx \frac{1 + G_{mL}R1}{(R5 + R1)C1} = \frac{1 + G_{mL}R1}{1 + R1/R5} \times \frac{1}{R5C1}$$

$$p_2 = \frac{1 + G_{m5}R9}{R9C3}$$

$$AV \approx \frac{G_{m1}R1}{1 + G_{mL}R1}.$$

It is known from the derivation mentioned above that a desire value of a low-frequency gain of the equalization circuit is obtained by setting the transconductance $G_{m1}$ of the first FET M1 and the first resistor R1; the zero pole Z is regulated via the fifth resistor R5 and the first capacitor C1;

the dominant pole P1 is regulated via the first resistor R1, the fifth resistor R5, the first capacitor C1 and the transconductance $G_{mL}$ of the third FET M3; the secondary pole P2 is regulated via the ninth resistor R9, the third capacitor C3, and the transconductance $G_{m5}$ of the fifth FET M5. I.e., the regulating range of the high frequency transmission energy is capable of being controlled by setting the first resistor R1, the fifth resistor R5, the first capacitor C1 and the transconductance $G_{mL}$ of the third FET M3; the regulating range of the high frequency transmission energy is fine regulated by the ninth resistor R9, the third capacitor C3, and the transconductance $G_{m5}$ of the fifth FET M5.

By regulating the zero pole Z, the dominant pole P1, and the secondary pole P2, the equalization circuit and the equalization system, according to preferred embodiments of the present invention, control the regulating range of the high frequency transmission energy, so as to ensure an accuracy of the signal received by the receiving terminal in the high-speed serial signal transmission system. The equalization circuit and the equalization system according to preferred embodiments of the present invention have a simple structure, a wide regulating range, and a controllable gain.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An equalization circuit, comprising a first input terminal, a second input terminal, a first output terminal, a second output terminal, a first regulating circuit connected with said first input terminal and said second input terminal for regulating a frequency-amplitude characteristic of input signals at said first input terminal and said second input terminal, a second regulating circuit connected with said first regulating circuit, said first output terminal and said second output terminal, and a bias voltage generating circuit, wherein said bias voltage generating circuit is respectively connected with said first regulating circuit and said second regulating circuit, said first regulating circuit comprises a first field effect transistor (FET) connected with said second input terminal, a second FET connected with said first FET, a third FET, a fourth FET connected with said third FET, a first resistor connected with said first FET, a second resistor connected with said second FET, a third resistor connected with said third FET, a fourth resistor connected with said fourth FET, a fifth resistor connected with said third FET and said third resistor, a sixth resistor connected with said fourth FET and said fourth resistor, a first capacitor connected with said third FET and said fifth resistor, and a second capacitor connected with said fourth FET and said sixth resistor.

2. The equalization circuit, as recited in claim 1, wherein a gate electrode of said first FET is connected with said second output terminal, a gate electrode of said second FET is connected with said first input terminal, a drain electrode of said first FET is connected with a first terminal of said first resistor, a first terminal of said third resistor, and a gate electrode of a fifth FET in said second regulating circuit, a drain electrode of said second FET is connected with a first terminal of said second resistor, a first terminal of said fourth resistor, and a gate electrode of a sixth FET in said second regulating circuit, both a source electrode of said first FET and a source electrode of said second FET are connected with a drain electrode of an eighth FET in said bias voltage generating circuit.

3. The equalization circuit, as recited in claim 1, wherein a gate electrode of said third FET is connected with a first terminal of said fifth resistor and a first terminal of said first capacitor, a drain electrode of said third FET is connected with a second terminal of said fifth resistor and a second terminal of said third resistor, a gate electrode of said fourth FET is connected with a first terminal of said sixth resistor and a first terminal of said second capacitor, a drain electrode of said fourth FET is connected with a second terminal of said sixth resistor, and a second terminal of said fourth resistor, both a source electrode of said third FET and a source electrode of said fourth FET are connected with a drain electrode of a ninth FET in said bias voltage generating circuit.

4. The equalization circuit, as recited in claim 1, wherein said second regulating circuit comprises a fifth FET connected with said first FET and said first resistor, a sixth FET connected with said second FET and said second resistor, a seventh resistor connected with said fifth FET, an eighth resistor connected with said sixth FET, a ninth resistor connected with said fifth FET and said sixth FET, and a third capacitor connected with said ninth resistor.

5. The equalization circuit, as recited in claim 4, wherein a drain electrode of said fifth FET is connected with a first terminal of said seventh resistor and said second output terminal, a source electrode of said fifth FET is connected with a first terminal of said ninth resistor, a first terminal of said third capacitor, and a drain electrode of a tenth FET in said bias voltage generating circuit, a drain electrode of said sixth FET is connected with a first terminal of said eighth resistor and said first output terminal, a source electrode of said sixth FET is connected with a second terminal of said ninth resistor, a second terminal of said third capacitor, and a drain electrode of an eleventh FET in said bias voltage generating circuit.

6. The equalization circuit, as recited in claim 1, wherein said bias voltage generating circuit comprises a seventh FET, an eighth FET connected with said first FET and said second FET, a ninth FET connected with said third FET and said fourth FET, a tenth FET connected with said ninth resistor, and an eleventh FET connected with said tenth FET; wherein a gate electrode of said seventh FET, a drain electrode of said seventh FET, a gate electrode of said eighth FET, a gate electrode of said ninth FET, a gate electrode of said tenth FET, and a gate electrode of said eleventh FET are all connected with a bias voltage terminal.

7. The equalization circuit, as recited in claim 6, wherein both a second terminal of said first resistor and a second terminal of said second resistor are connected with a power source terminal; a source electrode of said seventh FET, a source electrode of said eighth FET, a source electrode of said ninth FET, a source electrode of said tenth FET, and a source electrode of said eleventh FET are all connected with a ground terminal.

8. An equalization system, comprising a first input terminal, a second input terminal, a first output terminal, a second output terminal, a first regulating circuit connected with said first input terminal and said second input terminal for regulating a frequency-amplitude characteristic of differential signals at said first input terminal and said second input terminal, a second regulating circuit connected with said first regulating circuit for obtaining an appropriate regulating range of a transmission signal, and a bias voltage generating circuit for providing a constant current for said equalization system to work normally, wherein said bias voltage generating circuit is respectively connected with said first regulating circuit and said second regulating circuit;

wherein said first regulating circuit comprises a first field effect transistor (FET), a second FET connected with said first FET, a third FET, a fourth FET connected with said third FET, a first resistor connected with said first FET, a second resistor connected with said second FET, a third resistor connected with said third FET, a fourth resistor connected with said fourth FET, a fifth resistor connected with said third FET and said third resistor, a sixth resistor connected with said fourth FET and said fourth resistor, a first capacitor connected with said third FET and said fifth resistor, and a second capacitor connected with said fourth FET and said sixth resistor.

9. The equalization system, as recited in claim 8, wherein said second regulating circuit comprises a fifth FET connected with said first FET and said first resistor, a sixth FET connected with said second FET and said second resistor, a seventh resistor connected with said fifth FET, an eighth resistor connected with said sixth FET, a ninth resistor connected with said fifth FET and said sixth FET, and a third capacitor connected with said ninth resistor, wherein said bias voltage generating circuit comprises a seventh FET, an eighth FET connected with said first FET and said second FET, a ninth FET connected with said third FET and said fourth FET, a tenth FET connected with said fifth resistor, and an eleventh FET connected with said sixth FET.

\* \* \* \* \*